(12) United States Patent
Rathke et al.

(10) Patent No.: US 8,172,062 B2
(45) Date of Patent: May 8, 2012

(54) DEVICE FOR ACTUATING A FRICTION CLUTCH WITH AUTOMATIC ADJUSTMENT

(75) Inventors: Götz Rathke, Pfaffenweiler (DE); Klaus Dussel, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 12/380,574

(22) Filed: Feb. 28, 2009

(65) Prior Publication Data

US 2009/0229940 A1 Sep. 17, 2009

Related U.S. Application Data

(63) Continuation of application No. PCT/DE2007/001436, filed on Aug. 16, 2007.

(30) Foreign Application Priority Data

Aug. 31, 2006 (DE) .......................... 10 2006 040 993

(51) Int. Cl.
*F16D 13/75* (2006.01)
(52) U.S. Cl. .............................. 192/111.2; 192/70.252
(58) Field of Classification Search ............. 192/111.19, 192/111.4, 111.2
See application file for complete search history.

(56) References Cited

U.S. PATENT DOCUMENTS

| | | | | |
|---|---|---|---|---|
| 5,727,666 A | * | 3/1998 | Maucher | 192/70.252 |
| 6,405,846 B1 | * | 6/2002 | Reik et al. | 192/70.252 |
| 2004/0238307 A1 | | 12/2004 | Vogt et al. | 192/48.8 |
| 2004/0245063 A1 | * | 12/2004 | Vogt et al. | 192/70.25 |
| 2004/0262114 A1 | * | 12/2004 | Kimmig et al. | 192/89.24 |

FOREIGN PATENT DOCUMENTS

| | | |
|---|---|---|
| DE | 43 42 390 A1 | 6/1994 |
| DE | 10 2004 019 809 A1 | 11/2004 |
| GB | 2 273 751 A | 6/1994 |

* cited by examiner

*Primary Examiner* — David D Le
*Assistant Examiner* — Ryan Dodd
(74) *Attorney, Agent, or Firm* — Alfred J. Mangels

(57) ABSTRACT

A device for actuating a friction clutch with automatic adjustment. An actuating movement for engaging and disengaging the clutch is transmitted to a pressing component. The adjusting device includes a sensing component that is biased in the direction of an adjusting movement and compensates for sensing play that occurs as a result of wear when the clutch is engaged, and that compensates for play that occurs when the clutch is disengaged after compensation of the sensing play in the movement transmission between the actuating component and the transmission component. When the clutch is engaged and wear is present, the sensing component moves out of contact against a spring component which, when the clutch is engaged and wear is present, comes into contact against a stop before the fully engaged state of the clutch is reached.

7 Claims, 4 Drawing Sheets

DEVICE FOR ACTUATING A FRICTION CLUTCH WITH AUTOMATIC ADJUSTMENT

CROSS-REFERENCE TO RELATED APPLICATION

This application is a continuation of International Application Serial No. PCT/DE2007/001436, having an international filing date of Aug. 16, 2007, and designating the United States, the entire contents of which is hereby incorporated by reference to the same extent as if fully rewritten.

BACKGROUND OF THE INVENTION

1. Field of the Invention

The present invention relates to a device for actuating a friction clutch with automatic adjustment.

2. Description of the Related Art

From DE 10 2004 019 809 A1 a twin clutch assembly with automatic adjustment is known. The adjustment devices, which are associated with each particular clutch, are identical and respectively include a leaf spring shaped capture component, which is supported at a force transmission element 44 through a sensing or arresting element and through adjustment elements disposed parallel thereto, wherein said force transmission element is engaged by the transmission component. It is particular for the described adjustment devices that the sensing component, as well as the adjustment component, are disposed in the force transmission path from the leaf spring shaped capture element, actuated by the actuation element, to the force transmission element, so that the adjustment movements, which depend on the deformation or tilting of the leaf spring shaped capture element are coupled in a complex manner.

It is an object of the present invention to improve a device of said type, so that safe wear compensation is provided with a simple configuration.

SUMMARY OF THE INVENTION

According to the invention the object is accomplished by a device for actuating a friction clutch with automatic adjustment, which includes an actuation component whose actuation movement is transmitted to a force transmitting component through an adjustment device. An actuation movement for engaging and disengaging the clutch can be transmitted by the force transmitting component to a pressing component. The adjustment device includes a sensing component, which is biased in the direction of an adjustment movement, wherein when the clutch is disengaged the sensing component compensates a sensing clearance which occurs due to wear. The adjustment device includes an adjustment component which is biased in the direction of an adjustment movement, which adjustment component when the clutch is disengaged compensates a clearance which occurs in the transmission of the movement between the actuation component and the force transmitting component after the sensing clearance has been compensated. The sensing component is not initially included in the transmission of the movement from the actuation component to the force transmitting component, and the sensing component is disposed so that it comes clear by the amount of the sensing clearance from a contact with a spring element when the clutch is engaged and wear is present. The spring element contacts a stop when the clutch is being engaged and wear is present, before the clutch is completely engaged.

According to the invention a spring component is deformed by reaching a stop when the clutch is being engaged and wear is present, which creates a sensing clearance between the spring component and the sensing component, which is compensated by adjusting the sensing component. This changes the resting position, which the actuation component assumes when the clutch is being disengaged, so that a clearance, which occurs in the movement transmitted between the actuation component and the transmission component, is compensated by adjusting the adjustment component. The sensing component, as well as the adjustment component, is free of force under the respective clearances, so that their adjustment movements are being safely performed.

In one embodiment of the device according to the invention, the sensing component is disposed between the transmission component and the spring component, wherein the spring component, which is disposed at the transmission component, thereby comes into contact with a stop fixed to the housing when the clutch is being engaged, and the spring component comes clear from the sensing component when the required wear compensation is performed, so that the sensing clearance can be compensated by adjusting the sensing component.

Preferably, the spring component contacts the stop, which is fixed to the housing, with its side facing away from the sensing component when the clutch is disengaged.

Preferably, the adjustment component is disposed between the actuation component and the transmission component, wherein a clearance occurs in the movement transmitted between the actuation component and the transmission component after an adjustment of the sensing component, when the clutch is engaged and the actuation component is in its resting position, wherein the clearance can be compensated by adjusting the adjustment component.

In an embodiment of the device according to the invention, the adjustment component can be a lever, which is supported at a bearing carried at the housing, which lever imparts a pressing force through the adjustment component onto the transmission component in order to engage the clutch.

In another embodiment of the device according to the invention the actuation component is supported through the adjustment component at a clutch housing, and the sensing component contacts the actuation component at a distance from the adjustment component on the same side as the adjustment component, and furthermore it contacts the spring component fixed to the housing and contacts the housing, wherein the assembly is configured so that the sensing component comes clear from the actuation component during its engagement movement and the spring component comes clear from the sensing component by contacting a stop, which is configured at the transmission component, when the clutch is engaged and wear has occurred, so that the sensing component is adjustable for adjusting the sensing clearance.

The sensing component and the adjustment component are preferably configured by substantially annular components, which surround the axis of the clutch. The faces of the annular components are configured and interact with the opposed surfaces of the components interacting with those annular components, so that their effective axial length is a function of their angular position with reference to a rotation about the axis of the clutch.

The invention can be used for all types of wearing friction clutches. The device according to the invention, due to its simple and compact configuration, is suitable in particular for actuating a twin clutch assembly disposed in a parallel variable speed transmission, in particular for the start-up clutch of a dry twin clutch assembly. The adjustment device respectively adjusts the entire occurring wear; this means not only the wear of the friction linings, but also the wear at the contact points between the actuation members.

BRIEF DESCRIPTION OF THE DRAWINGS

The invention is hereinafter described in more detail in an exemplary manner with reference to schematic drawing figures, wherein.

DESCRIPTION OF THE PREFERRED EMBODIMENTS

Figure 1:
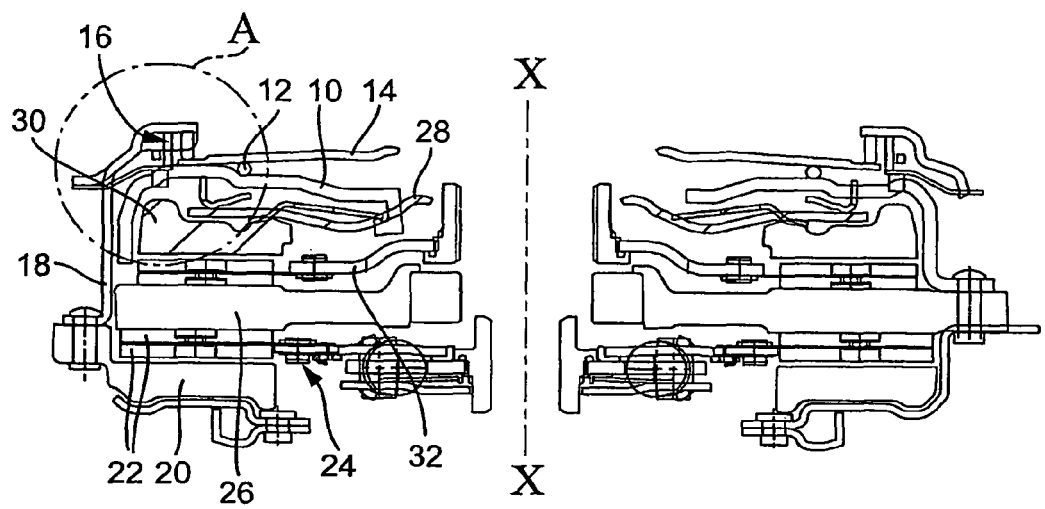
FIG. 1 shows a sectional view of components of a friction clutch in a plane including the axis of the clutch.

According to FIG. 1, a clutch whose axis is designated with X-X in FIG. 1 comprises includes a housing 10 of which only a cover is shown. An actuation lever 14 is supported by a wire ring bearing 12 at the housing 10, wherein through components of an adjustment device designated overall with by 16 said actuation lever actuates a pull member 18, which is rigidly connected with a pressure plate 20. By moving the pressure plate 20 upward according to FIG. 1, friction linings 22 of a clutch disc 24 come in frictional contact with the pressure plate 20 and with an intermediate plate 26 mounted to the housing 10.

Through another actuation lever 28 another pressure plate 30 can be moved downward according to FIG. 1, so that another clutch disc 32 comes in frictional engagement with the intermediate plate 26 or with the pressure plate 30.

Besides the two clutch discs 24 and 32, all components mentioned above can be non-rotatably connected with the output shaft of an internal combustion engine. The clutch disc 24 can be non-rotatably connected with a first clutch shaft (not shown) and which is disposed within a hollow second clutch shaft (not shown), to which the clutch disc 32 can be non-rotatably connected. The actuation levers 14 and 28 can be actuated by release bearings, which are supported on the outer clutch shaft (not shown).

The configuration and the function of the twin clutch are generally known and are therefore not further described.

It should be appreciated that the components visibly disposed only in the sectional view on both sides of the axis X-X, are substantially disc- or ring shaped components which surround the axis X-X.

Subsequently, the adjustment device according to the invention is described with reference to FIG. 2, which shows detail A of FIG. 1 in an enlarged scale.

It is evident that the transmission of movement is performed by the actuation lever 14, e.g. an annular disc with invert protruding inwardly-extending spring tongues, onto the pull member 18 which is used as a movement component for transmitting the movement of the lever 14 onto a pressure plate 20 through an adjustment ring 34, whose axial face, which contacts the pull member 18, is configured as a ramp and interacts with respective ramp surfaces 36 configured at the pull member. The adjustment ring 34 is biased in the circumferential direction relative to the pull member 18 by springs (not shown) acting in the circumferential direction, so that the adjustment ring 34 rotates relative to the pull member 18 and relative to the actuation lever 14, when the distance between the pull member 18 and the actuation lever is increased, so that through relative movement between the ramp surfaces zero clearance is maintained in the transmission of movement from the actuation lever 14 to the pull member 18.

On the housing 10, furthermore, a lower stop 38 is provided, at which a spring element 40, which is mounted to the pull member 18 and is configured as a tension spring, contacts lower stop 38 in the illustrated disengaged position of the clutch. A sensing ring 42 is disposed between the spring element 40 and the pull member 18, which is biased in a similar manner as the adjustment ring 34 by springs (not shown), for rotation in the circumferential direction, wherein said sensing ring springs are supported at the sensing ring 42 and at the pull member 18. The contact of the sensing ring 42 at the pull member 18 is performed by ramp surfaces 44.

According to the figure an upper stop 46 that is fixed to the housing is provided above the lower stop 38. The function of said upper stop 46 will be described below.

Based upon FIG. 3 an adjustment process with five states a)-f) is described below:

In state a), the clutch is disengaged. That means the actuation lever 14 is mostly pivoted counterclockwise and the pull member 18 according to the figure is in its lowest position, in which the spring element 40 contacts the lower stop 38.

In state b), the clutch is being engaged by pivoting the actuation lever 14 clockwise, wherein the full contact pressure of the pressure plate against the clutch disc is not yet reached and the spring element 40, which has come clear from the lower stop 38, follows the movement of the pull member 18. A state is illustrated in which the spring element 40 comes into contact with the upper stop 46.

Figure 3A:
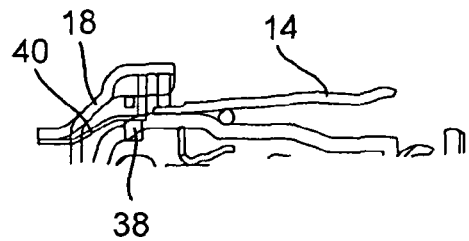
FIG. 3 shows six different actuation states of components in order to illustrate the adjustment process.
Figure 3B:
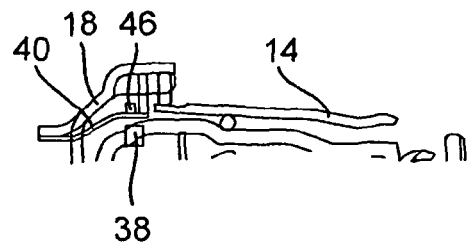
Figure 3C:
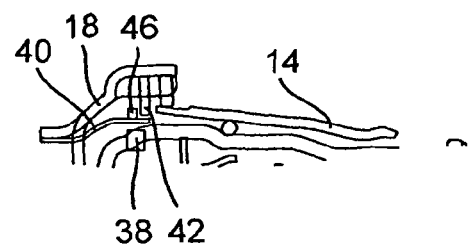
Figure 3D:
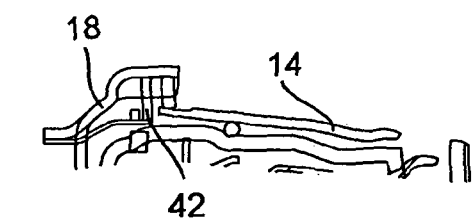
Figure 3E:
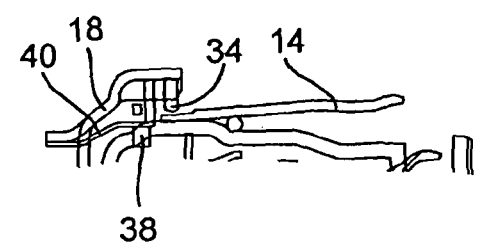
Figure 3F:
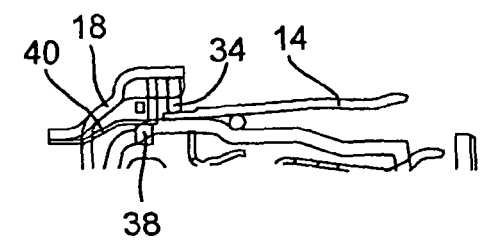

When the actuation lever 14 is actuated further for full engagement of the clutch, as shown in FIG. 3c, the spring element 40 is deflected by contact with the upper stop 46, so that the sensing ring 42 separates from contact with the spring element 40 and becomes force free. The amount, by which the sensing ring 42 clears the spring element 40 depends on the wear of the clutch, and it becomes larger with increasing wear.

The clearance that occurs between the sensing ring 42 and the spring element 40 is reduced in the state d) by adjusting the sensing ring, which is free of contact forces and thus is rotatable with little friction, so that the clearance is safely compensated. The state d) in which the sensing ring 42 contacts the spring element 40 and the pull member 18 without clearance, is the fully engaged state of the clutch after the sensing clearance or the sensing gap has been compensated.

When the clutch is disengaged (state e)), the spring element 40 in turn comes into contact with the lower stop 38, wherein the distance between the pull member 18 and the lower stop 38 is increased due to the adjusted sensing ring 42. Thus, when the actuation lever 14 is in the disengaged position (same position as in state a)), a clearance between the adjustment ring 34 and the actuation lever 14 occurs, which is compensated by rotatably adjusting the adjustment ring 34 since hardly any forces are present. The state f) thus corresponds to the state a), in which no clearance exists at the contact surfaces of the rings, but the pull member 18 is adjusted upward overall in order to compensate for wear according to the figure.

Figure 4:
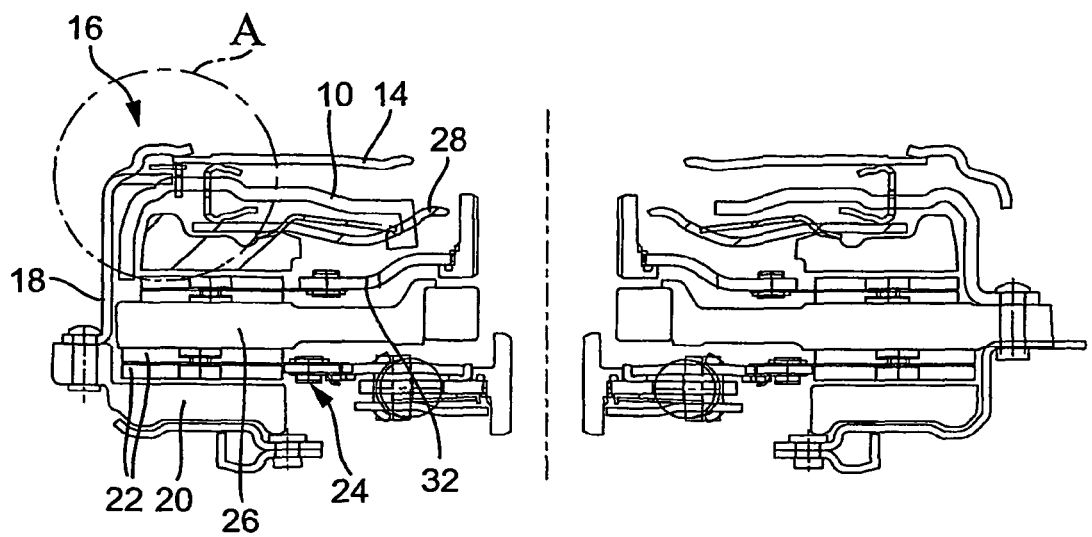
FIG. 4-6 show figures corresponding to FIGS. 1-3 for illustrating another embodiment of the clutch according to the invention.

FIG. 4 shows an embodiment of a clutch, which is revised relative to FIG. 1 with respect to the adjustment device and the support of the actuation lever at the housing.

Figure 5:
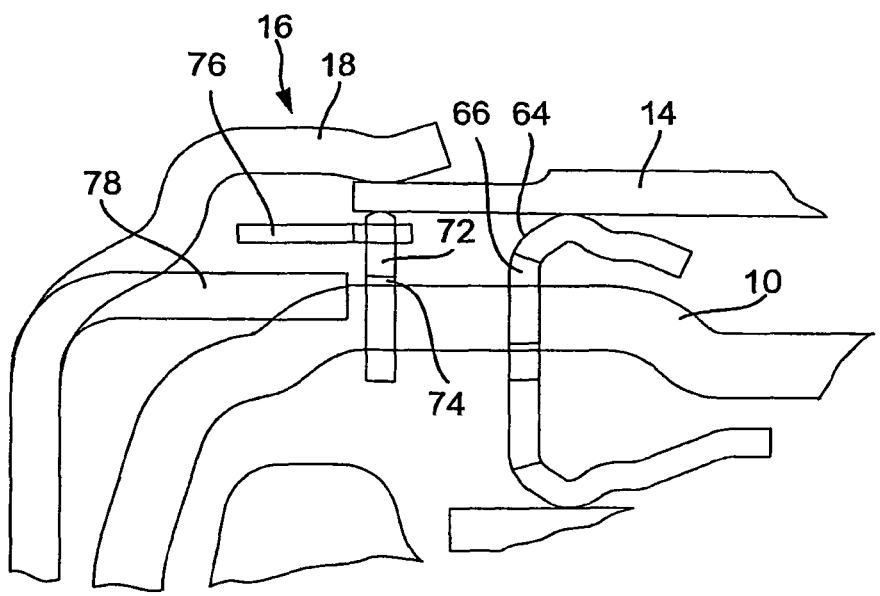
Figure 6A:
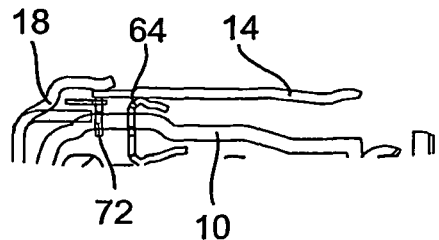
Figure 6B:
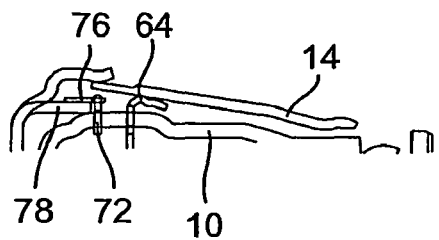
Figure 6C:
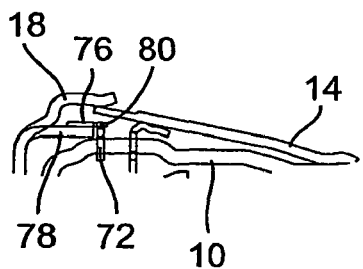
Figure 6D:
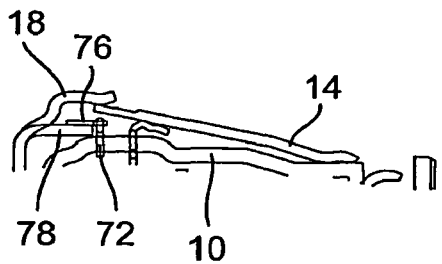
Figure 6E:
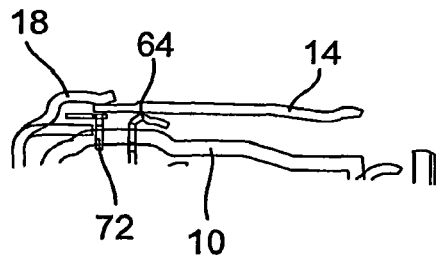
Figure 6F:
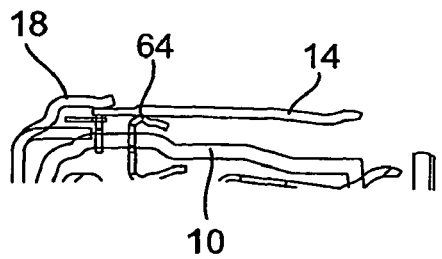

According to FIGS. 4 and 5, the actuation lever 14 is not supported on the housing 10 by a wire ring bearing 12 in this embodiment, like in FIG. 1, but it is supported by an adjustment ring 64, which contacts the housing 10 through ramp surfaces 66 and which is biased by springs (not shown) relative to the housing 10 for rotation in the circumferential direction.

At the free end of the lever 14, opposite to the contact point between the lever 14 and the pull member 18, a sensing ring 72 is disposed which contacts the lower side of the actuation lever 14 with its outer radial surface and which contacts the housing 10 with its inner radial surface through respective ramp surfaces 74. At the housing 10 a spring element 76 is mounted, which is configured as a tension spring that interacts with the sensing ring 72 and with a protrusion of the pull member 18, which forms a stop 78 as described below.

Figure 2:
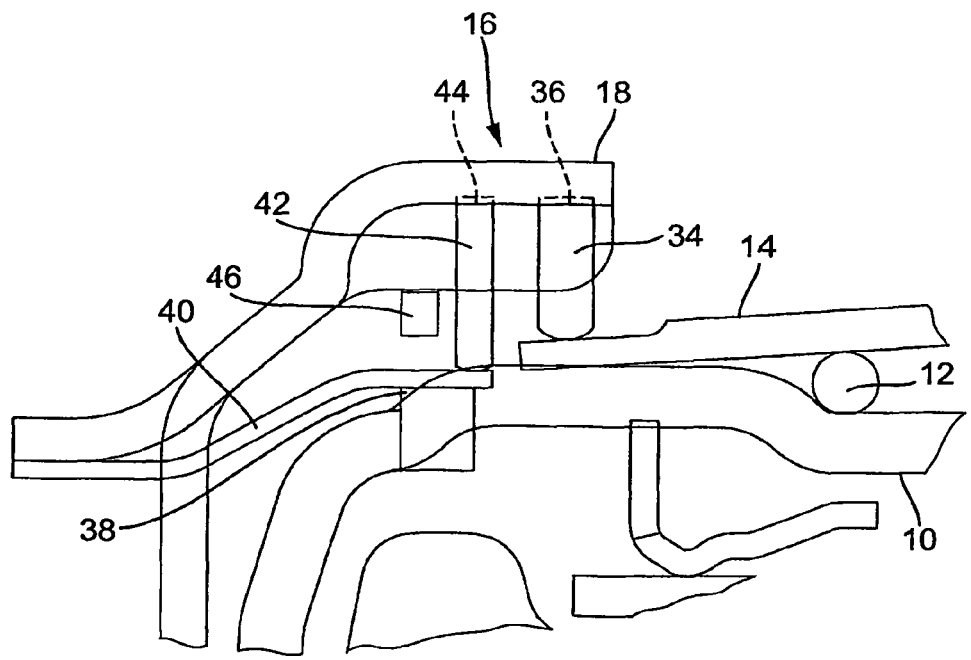
FIG. 2 shows detail A of FIG. 1.

The function of the assembly according to FIGS. 4 and 5 is described in a similar manner as the function of the assembly according to FIGS. 1 and 2 with reference to six states a) through f) shown in FIG. 6.

State a) illustrates the clutch in the disengaged state. The actuation lever 14, which is in the disengagement position, contacts the adjustment ring 64 and it is forced by the pull member 18, which is disposed in the disengagement position of the clutch, to contact the sensing ring 72 with its free end, wherein the sensing ring is supported at the housing 10.

In order to engage the clutch, the actuation lever 14 is pivoted clockwise about its support location on the adjustment ring 64 (state b)). Its free end thus clears the sensing ring 72, whose rotatability is restricted, however, by its contact with the spring element 76.

When wear has occurred in the clutch, the actuation lever 14 can continue to move from the position according to b) to state c), in which the pull member 18 has moved upward far enough, so that the stop 78 contacts the spring element 76, so that the spring element 76 is moved upward by the stop 78 and comes clear from the sensing ring 72, which creates a sensing gap, which can be compensated by rotating the biased sensing ring 72 (state d)), so that, in turn, no clearance exists between the sensing ring 72 and the spring element 76, which is then deflected upward according to the figure.

When the clutch is subsequently disengaged and the actuation lever 14 is moved back into its disengagement position (state e)), which brings the free end of the actuation lever into contact with the sensing ring 72, which has been rotated relative to the state a), the adjustment ring 64 become force free, so that it can be readjusted due to its bias in the circumferential direction (state f) and the disengaged state of the clutch is reached without clearance and with wear compensation.

The invention, which is described with reference to two embodiments, facilitates reliable wear adjustment, wherein not only the wear of friction linings, but also the wear in the actuation system of the clutch is compensated. In principle, the adjustment can also compensate for tolerances between transmission and clutch, so that aligning the clutch disk in the transmission factory can be avoided. The described wear adjustment is not sensitive to the sagging of springs and dynamic influences.

What is claimed is:

1. A device for actuating a friction clutch having automatic adjustment, which device comprises:
    an axially-movable actuation component, whose axial actuation movement is transmitted through an adjustment device to an axially movable force transmitting component, by means of which force transmitting component the actuation movement of the actuation component for engaging and disengaging the clutch is transmitted to an axially movable pressing component, wherein the adjustment device includes
    a sensing component which is biased in a circumferential adjustment movement direction, which sensing component compensates for clearance that occurs due to clutch disk lining wear when the clutch is engaged, wherein the sensing component is disposed between the force transmitting component and an axially-acting spring element carried by the force transmitting component, and which adjustment device further includes
    an adjustment component which is biased in a circumferential adjustment movement direction, which adjustment component compensates for the clearance which occurs in the movement transmitted between the actuation component and the force transmitting component when the clutch is disengaged and after the clearance has been sensed,
    wherein the sensing component is not moved circumferentially during initial clutch actuation movement transmitted from the actuation component to the force transmitting component, wherein during continued clutch engagement movement after initial clutch actuation movement the sensing component is spaced from the spring element and from a first stop carried by a clutch housing, and wherein a sensing clearance results between the sensing component and the spring element as the clutch is engaged and clutch disk lining wear exists,
    wherein the spring element contacts a second stop carried by the force transmitting component and which second stop is spaced axially from the first stop as the clutch is being engaged and clutch disk lining wear exists, wherein the spring element is spaced axially from the sensing component to allow circumferential movement of the sensing component before the fully engaged state of the clutch is reached.

2. A device according to claim 1, wherein the sensing component is disposed between the force transmitting component and the spring element carried by the force transmitting component, and when the clutch is being engaged the spring element thereby comes in contact with the second stop, and which spring element comes clear from the sensing component when wear compensation is required, so that the sensing clearance can be compensated by adjusting the sensing component.

3. A device according to claim 2, wherein the spring element contacts the first stop with its side facing away from the sensing component when the clutch is disengaged.

4. A device according to claim 2, wherein the sensing component is disposed between the actuation component and the force transmitting component, wherein a clearance in a movement transmitted between the actuation component and the force transmitting component occurs after an adjustment of the sensing component, when the clutch is engaged and the actuation component is in its resting position, which clearance is compensated by adjusting the adjustment component.

5. A device according to claim 1, wherein the actuation component is a lever that is supported at a pivot member which is carried by the housing, which lever imparts a pressing force for engaging the clutch through the adjustment component upon the force transmitting component.

6. A device according to claim 1, wherein the sensing component and the adjustment component are annular components that surround the axis of the clutch and have outer faces that interact with opposite surfaces of the components interacting with them, so that their effective axial length is a function of their angular position with reference to a rotation about the axis of the clutch.

7. A device according to claim 1, wherein the device is provided for actuating a clutch of a parallel variable speed transmission of a twin clutch assembly.

* * * * *